United States Patent
Wolf et al.

(10) Patent No.: US 11,932,172 B1
(45) Date of Patent: Mar. 19, 2024

(54) STORAGE FOR A DISPLAY SCREEN

(71) Applicants: Philipp J. Wolf, Capistrano Beach, CA (US); Jeffrey M. Riepling, Clayton, CA (US); James J. Dowle, Laguna Beach, CA (US)

(72) Inventors: Philipp J. Wolf, Capistrano Beach, CA (US); Jeffrey M. Riepling, Clayton, CA (US); James J. Dowle, Laguna Beach, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/571,630

(22) Filed: Jan. 10, 2022

Related U.S. Application Data

(60) Provisional application No. 63/167,373, filed on Mar. 29, 2021.

(51) Int. Cl.
*B60R 11/02* (2006.01)
*B60N 2/01* (2006.01)
*B60R 7/02* (2006.01)
*B60R 11/00* (2006.01)

(52) U.S. Cl.
CPC ............ *B60R 11/0229* (2013.01); *B60N 2/01* (2013.01); *B60R 7/02* (2013.01); *B60R 2011/0036* (2013.01)

(58) Field of Classification Search
CPC ... B60R 11/0229; B60R 11/0235; B60R 7/02; B60R 7/04; B60R 2011/0036; B60R 2011/0085; B60R 2011/0091; B60R 2011/0092; B60N 2/01; B60N 2/22
USPC .................................... 296/37.5, 37.8, 37.16
See application file for complete search history.

(56) References Cited

U.S. PATENT DOCUMENTS

| | | | |
|---|---|---|---|
| 3,446,526 A * | 5/1969 | Peters ................. | B60N 2/3011 296/37.16 |
| 9,272,671 B2 | 3/2016 | Vander Sluis | |
| 10,613,579 B2 * | 4/2020 | Wang ................. | H05K 5/0021 |
| 10,931,910 B2 | 2/2021 | Bottomly | |
| 2004/0061662 A1 * | 4/2004 | Yoshihara ........... | B60R 11/0235 345/1.1 |
| 2005/0140191 A1 * | 6/2005 | Curran ................ | B60R 11/0235 297/217.3 |
| 2009/0008974 A1 * | 1/2009 | Hattori ................ | B60R 11/0235 297/217.3 |

(Continued)

FOREIGN PATENT DOCUMENTS

| | | | | |
|---|---|---|---|---|
| DE | 102004047609 A1 | | 5/2005 | |
| DE | 202015008346 U1 * | | 4/2016 | ............ B60K 35/00 |

(Continued)

OTHER PUBLICATIONS

Stegerer et al., DE 102019101411 A1, machine translation, Jul. 23, 2020 (Year: 2020).*

*Primary Examiner* — Amy R Weisberg
*Assistant Examiner* — Wenwei Zhuo
(74) *Attorney, Agent, or Firm* — Young Basile Hanlon & MacFarlane, P.C.

(57) ABSTRACT

A first seat, a surface located behind the first seat, a display screen, and a support assembly. The support assembly is configured to move the display screen to a storage position, in which the display screen is positioned adjacent to the surface. The support assembly includes a pivot connected to the display screen and a track configured to support the pivot. The pivot is configured to move along the track.

22 Claims, 13 Drawing Sheets

(56) References Cited

U.S. PATENT DOCUMENTS

| | | | | |
|---|---|---|---|---|
| 2017/0341588 A1* | 11/2017 | Southey | ............... | B60N 2/3011 |
| 2018/0027689 A1* | 1/2018 | Muldowney | ........ | B60R 11/0235 |
| | | | | 361/807 |
| 2020/0114785 A1* | 4/2020 | Hagedorn | ................ | B60N 2/14 |
| 2022/0260204 A1* | 8/2022 | Çevik et al. | ......... | F16M 13/027 |

FOREIGN PATENT DOCUMENTS

| | | | | | |
|---|---|---|---|---|---|
| DE | 102019101411 A1 | * | 7/2020 | ......... | B60R 11/0235 |
| KR | 20060026163 A | * | 3/2006 | ............... | B60R 7/04 |
| KR | 20060029961 A | * | 4/2006 | ............. | B60R 11/02 |
| WO | 2021159610 A1 | | 8/2021 | | |

* cited by examiner

STORAGE FOR A DISPLAY SCREEN

CROSS-REFERENCE TO RELATED APPLICATION(S)

This application claims the benefit of U.S. Provisional Patent Application No. 63/167,373, filed on Mar. 29, 2021, the content of which is hereby incorporated by reference in its entirety for all purposes.

TECHNICAL FIELD

This disclosure relates to storing a movable display screen that is connected to a support assembly.

BACKGROUND

Structures may include display screens. As examples, display screens may be used to display information or entertainment content.

SUMMARY

One aspect of the disclosure is a vehicle including a first seat, a luggage compartment located behind the first seat, and a surface located behind the first seat and above the luggage compartment, the surface defining an opening that permits access to the luggage compartment. The vehicle also includes a display screen and a support assembly connected to the display screen. The support assembly is configured to move the display screen to a storage position, in which the display screen is positioned adjacent to the surface and obstructs the opening, and a luggage access position, in which the display screen is spaced from the surface and does not obstruct the opening.

In some implementations of the vehicle, the vehicle includes a second seat, and the support assembly is further configured to move the display screen to a viewing position, in which the display screen is spaced from the surface and oriented toward the second seat so that the display screen is viewable from the second seat.

In some implementations of the vehicle, the second seat faces toward the first seat.

In some implementations of the vehicle, the display screen is located behind the first seat in the storage position, and the display screen is located between the first seat and the second seat in the viewing position.

In some implementations of the vehicle, the support assembly includes an actuator configured to cause movement of the display screen.

In some implementations of the vehicle, the support assembly includes a first pivot connected to the display screen, a second pivot connected to the luggage compartment, and an arm connected to the first pivot and the second pivot.

In some implementations of the vehicle, the arm is a segmented arm including a first arm portion and a second arm portion connected by a third pivot.

In some implementations of the vehicle, the support assembly includes a pivot connected to the display screen and a track configured to support the pivot, and the pivot is configured to move along the track.

In some implementations of the vehicle, the first seat includes a first seat back that is movable relative to a first seat bottom between a use position, in which the first seat back obstructs access to the opening, and a folded position, in which the first seat back permits access to the opening.

Another aspect of the disclosure is a vehicle including a first seat, a second seat facing toward the first seat, a display screen, and a support assembly connected to the display screen. The support assembly is configured to move the display screen to a storage position, in which the display screen is located behind the first seat, and a viewing position, in which the display screen is viewable from the second seat.

In some implementations of the vehicle, the display screen is located between the first seat and the second seat in the viewing position.

In some implementations of the vehicle, the support assembly includes an actuator configured to cause movement of the display screen.

In some implementations of the vehicle, the vehicle includes a luggage compartment located behind the first seat and a surface located behind the first seat and above the luggage compartment. The surface defines an opening that permits access to the luggage compartment. In the storage position, the display screen is positioned adjacent to the surface and obstructs the opening. The support assembly is further configured to move the display screen to a luggage access position, in which the display screen is spaced from the surface and permits access to the opening.

In some implementations of the vehicle, the first seat includes a first seat back that is movable relative to a first seat bottom between a use position, in which the first seat back obstructs access to the opening, and a folded position, in which the first seat back permits access to the opening.

In some implementations of the vehicle, the vehicle includes a surface located behind the first seat. In the storage position, the display screen is positioned adjacent to the surface.

Another aspect of the disclosure is a vehicle including a first seat, a surface located behind the first seat, a display screen, and a support assembly connected to the display screen. The support assembly is configured to move the display screen to a storage position, in which the display screen is positioned adjacent to the surface.

In some implementations of the vehicle, the vehicle includes a second seat. The support assembly is further configured to move the display screen to a viewing position, in which the display screen is spaced from the surface and oriented toward the second seat so that the display screen is viewable from the second seat.

In some implementations of the vehicle, the second seat faces toward the first seat, and the display screen is located between the first seat and the second seat in the viewing position.

In some implementations of the vehicle, the vehicle includes a luggage compartment located behind the first seat. The surface is located above the luggage compartment and defines an opening that permits access to the luggage compartment. In the storage position, the display screen is positioned adjacent to the surface and obstructs the opening. The support assembly is further configured to move the display screen to a luggage access position, in which the display screen is spaced from the surface and permits access to the opening.

In some implementations of the vehicle, the first seat includes a first seat back that is movable relative to a first seat bottom between a use position, in which the first seat back obstructs access to the opening, and a folded position, in which the first seat back permits access to the opening.

DETAILED DESCRIPTION

A vehicle includes a first seat, a luggage compartment located behind the first seat, a surface located behind the first seat and above the luggage compartment, a display screen, and a support assembly connected to the display screen. The surface defines an opening that permits access to the luggage compartment. The support assembly is configured to move the display screen to a storage position, in which the display screen is positioned adjacent to the surface and obstructs the opening, and a luggage access position, in which the display screen is spaced from the surface and does not obstruct the opening. The vehicle may also include a second seat, and the support assembly is further configured to move the display screen to a viewing position, in which the display screen is spaced from the surface and oriented toward the second seat so that the display screen is viewable from the second seat.

Figure 1:
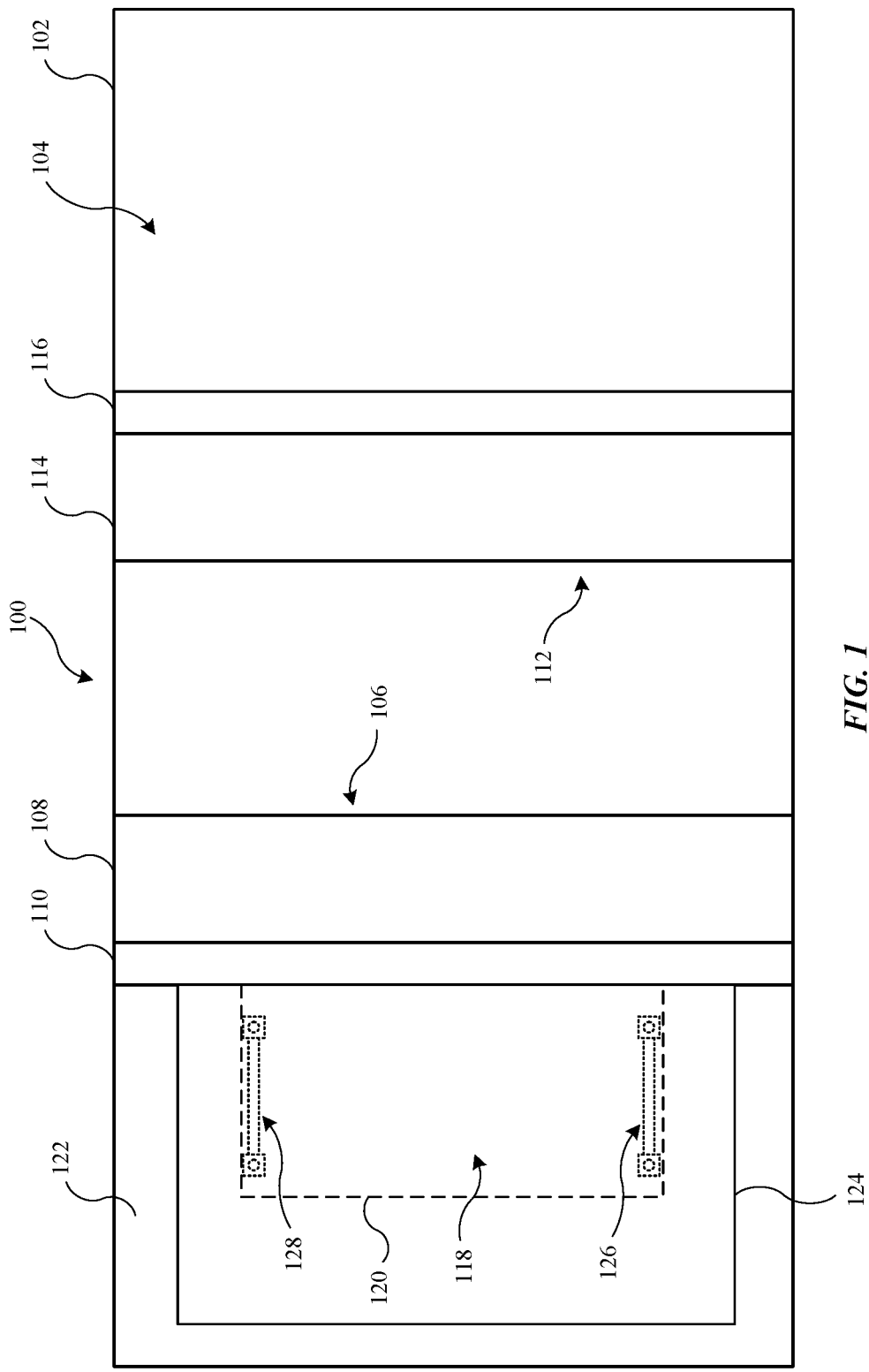
FIG. 1 is a top view of a passenger compartment of a vehicle with a display screen in a storage position.

FIG. 1 is a top view of a passenger compartment 104 of a vehicle 100 with a display screen 124 in a storage position. In an implementation, the display screen 124 may include a light-emitting display screen including, but not limited to, a liquid crystal display (LCD), a light-emitting diode (LED) display, or a quantum dot (QLED) display. In an implementation, the display screen 124 may include a surface onto which images can be projected. The display screen 124 may be used to display content including, but not limited to, infotainment content, productivity content, content from an in-vehicle entertainment system, content from a vehicle operation system (e.g., navigation content), or content streamed from a user device (e.g., a phone or a laptop computer).

In an implementation, the display screen 124 may be located in a rear of the vehicle 100 relative to the direction of travel. In an implementation, the display screen 124 may be located in a front of the vehicle 100 relative to the direction of travel. In an implementation, the vehicle 100 may include two display screens, a first display screen located in the rear of the vehicle 100 relative to the direction of travel and a second display screen located in the front of the vehicle 100 relative to the direction of travel. For clarity, the figures and the description include one display screen 124, but the features and operation of the description are equally applicable regardless of the location of the display screen 124 relative to the direction of travel or if there are two display screens present.

The vehicle 100 includes a body structure 102 that defines the passenger compartment 104. The passenger compartment 104 includes a first seat 106 having a first seat bottom 108 and a first seat back 110. The passenger compartment 104 includes a second seat 112 having a second seat bottom 114 and a second seat back 116. The second seat 112 faces toward the first seat 106. The first seat 106 and the second seat 112 may be fixedly connected to the body structure 102 or movably connected to the body structure 102. The first seat bottom 108 and the second seat bottom 114 define seating surfaces of the first seat 106 and the second seat 112 that are configured to be sat on by a passenger who is seated in the passenger compartment 104 by engagement with portions of the lower body of the passenger. The first seat back 110 and the second seat back 116 extend generally upwards from the first seat bottom 108 and the second seat bottom 114 to define seating surfaces of the first seat 106 and the second seat 112 that are configured to engage portions of the upper body of the passenger who is seated in the passenger compartment 104. The first seat back 110 and the second seat back 116 may be mounted in a manner that allows movement (e.g., by pivoting) with respect to the first seat bottom 108 and the second seat bottom 114 to allow adjustment of a recline angle or to fold forward (i.e., towards a center of the passenger compartment 104) to allow access to areas behind the first seat 106 and the second seat 112. While the first seat 106 and the second seat 112 are shown in FIG. 1 as "bench style" seats, it is noted that first seat 106 and second seat 112 may take different configurations.

The passenger compartment 104 includes a luggage compartment 118 which is accessed via an opening 120. The opening 120 extends in a generally horizontal direction (as shown by the dashed outline in FIG. 1) and in a generally vertical direction behind the first seat back 110. A passenger can access the luggage compartment 118 when the display screen 124 is in a luggage access position and the first seat back 110 is moved toward the first seat bottom 108, as will be described in connection with FIG. 4.

A surface 122 is located behind the first seat 106 and extends generally horizontally from a rear of the first seat back 110 to walls defined by the body structure 102. In this instance, the term "behind" is relative to the first seat 106 and is not related to a direction of travel of the vehicle 100. In an implementation, the opening 120 is an opening in the surface 122. The display screen 124 may be in contact with at least a portion of the surface 122 when the display screen 124 is in the storage position.

When the display screen 124 is in the storage position, the display screen 124 is not viewable by a passenger seated in the passenger compartment 104. In the storage position, the display screen 124 is parallel to the surface 122 and located such that the display screen 124 covers at least a portion of the opening 120. In an implementation, when the display screen 124 is in the storage position, the display screen 124 is positioned adjacent to the surface 122 and obstructs access to the opening 120 such that the luggage compartment 118 is hidden from a passenger.

The display screen 124 may also be in a viewing position in which the display screen 124 is viewable by a passenger seated in the passenger compartment 104, for example seated in the second seat 112. To allow viewing from the second seat 112, the second seat 112 faces toward the display screen 124. The viewing position will be discussed in greater detail in connection with FIG. 3.

When the display screen is in the luggage access position, the display screen 124 may not be viewable by a passenger seated in the passenger compartment 104. In the luggage access position, the display screen 124 is spaced away from the surface 122 such that a passenger can access the luggage compartment 118 through the opening 120. In an implementation, the first seat back 110 may also be moved away from the opening 120 while the display screen 124 is in the luggage access position such that the passenger can access the luggage compartment 118 through the opening 120. The luggage access position will be discussed in greater detail in connection with FIG. 4.

The display screen 124 may be moved from the storage position to the luggage access position, and back to the storage position. The display screen 124 may be moved from the storage position to the viewing position, and back to the storage position. The display screen 124 may be moved from the viewing position to the luggage access position and back to the viewing position, either directly or via temporarily being in the storage position.

A first support assembly 126 is positioned adjacent to the opening 120. A second support assembly 128 is positioned adjacent to the opening 120, at an opposite side of the opening 120 as the first support assembly 126. The first support assembly 126 and the second support assembly 128 are configured to support the display screen 124 and to move the display screen 124 between the storage position, the viewing position, and the luggage access position. It is noted that while the first support assembly 126 and the second support assembly 128 are shown in FIG. 1 as being positioned on an interior portion of the opening 120, the first support assembly 126 and the second support assembly 128 may be positioned on an exterior portion of the opening 120. In an implementation, the first support assembly 126 and the second support assembly 128 are positioned proximate to the opening 120 such that when the display screen 124 is in the storage position, the display screen 124 obstructs access to the opening 120 and that when the display screen 124 is in the luggage access position, the display screen 124 is spaced from the opening 120 such that a passenger may access the luggage compartment 118.

While FIG. 1 shows both the first support assembly 126 and the second support assembly 128, in an implementation, only one support assembly may be used. In such an implementation, the support assembly is configured to support the display screen 124 such that the display screen 124 may be moved between the storage position, the viewing position, and the luggage access position. As used herein, the term "support assembly" encompasses all components that support the display screen 124 and enable the display screen 124 to be moved between the storage position, the viewing position, and the luggage access position. A few exemplary configurations of the support assembly are described in further detail below.

Figure 2:
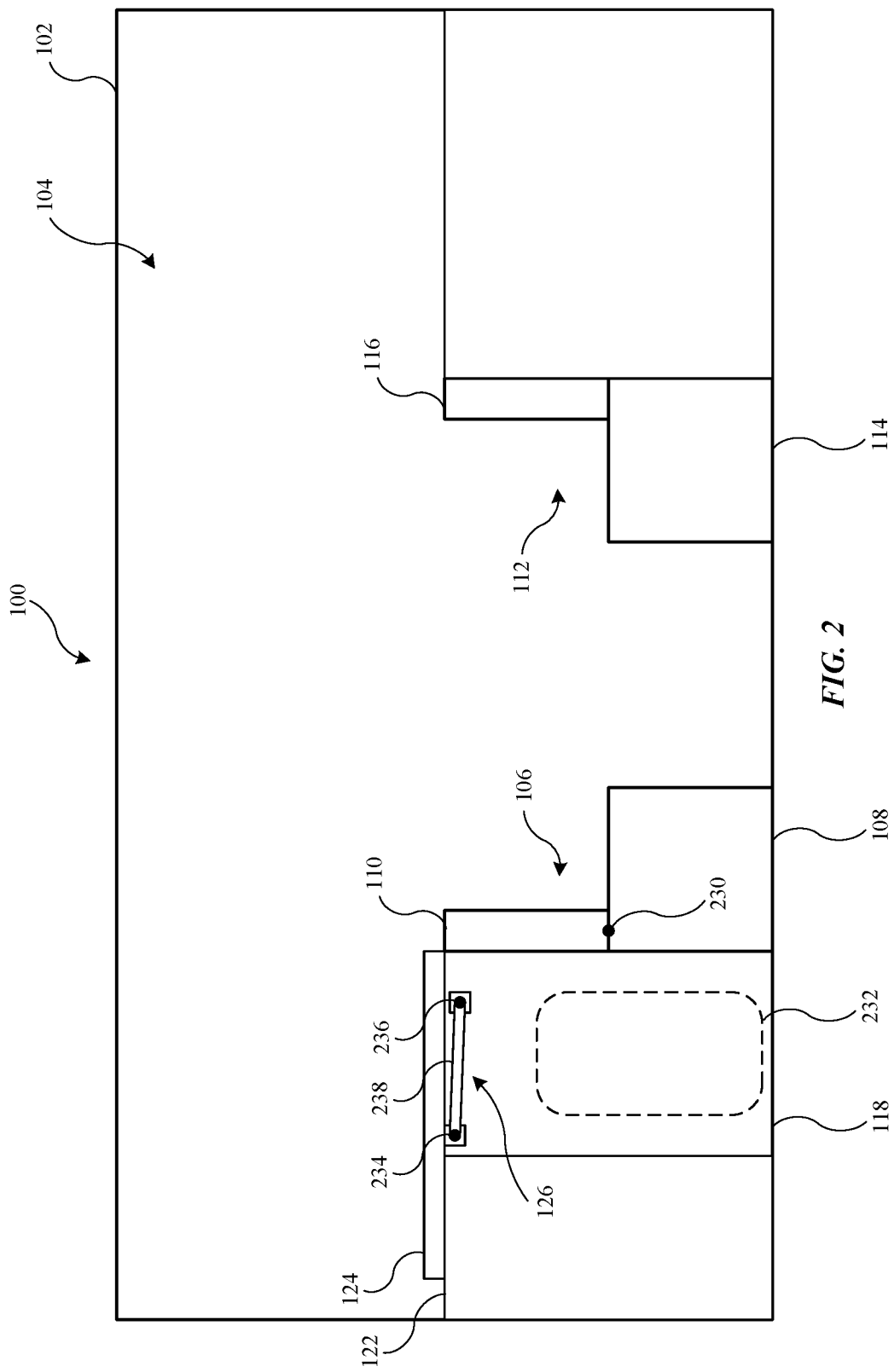
FIG. 2 is a side view of the passenger compartment of the vehicle with the display screen in the storage position.

FIG. 2 is a side view of the passenger compartment 104 of the vehicle 100 with the display screen 124 in the storage position. The first seat 106 includes a first seat pivot 230 around which the first seat back 110 may be moved relative to the first seat bottom 108, as will be described in connection with FIG. 4. The luggage compartment 118 is configured to store one or more pieces of luggage 232 such that the display screen 124 covers at least a portion of the opening 120 without the luggage 232 extending beyond the opening 120. In an implementation, the display screen 124 completely obstructs the opening 120 such that the luggage compartment 118 and the luggage 232 are hidden from a passenger.

The first support assembly 126 includes a first pivot 234 connected to the display screen 124 and a second pivot 236 connected to the luggage compartment 118. In an implementation, the second pivot 236 may be connected to a different location of the body structure 102 proximate to the opening 120. The first pivot 234 and the second pivot 236 are support structures that include actuated or non-actuated pivot joints. The first pivot 234 and the second pivot 236 are connected to the display 124 and the luggage compartment 118, respectively, either directly or indirectly, such as by brackets, fasteners, frames, or other type of connector. The first pivot 234 is connected to the second pivot 236 by an arm 238. It is noted that while the second support assembly 128 is not shown in FIG. 2, the second support assembly 128 may be constructed in a similar manner as the first support assembly 126.

It is noted that the first support assembly 126 and the second support assembly 128 may take on different configurations, including other brackets, fasteners, frames, connectors, attachments, or mounting mechanisms such that the first support assembly 126 and the second support assembly 128 are connected to the display screen 124 and the luggage compartment 118, respectively, such that the display screen 124 can be moved between the storage position, the viewing position, and the luggage access position either manually by a passenger or automatically when initiated by a passenger.

Figure 3:
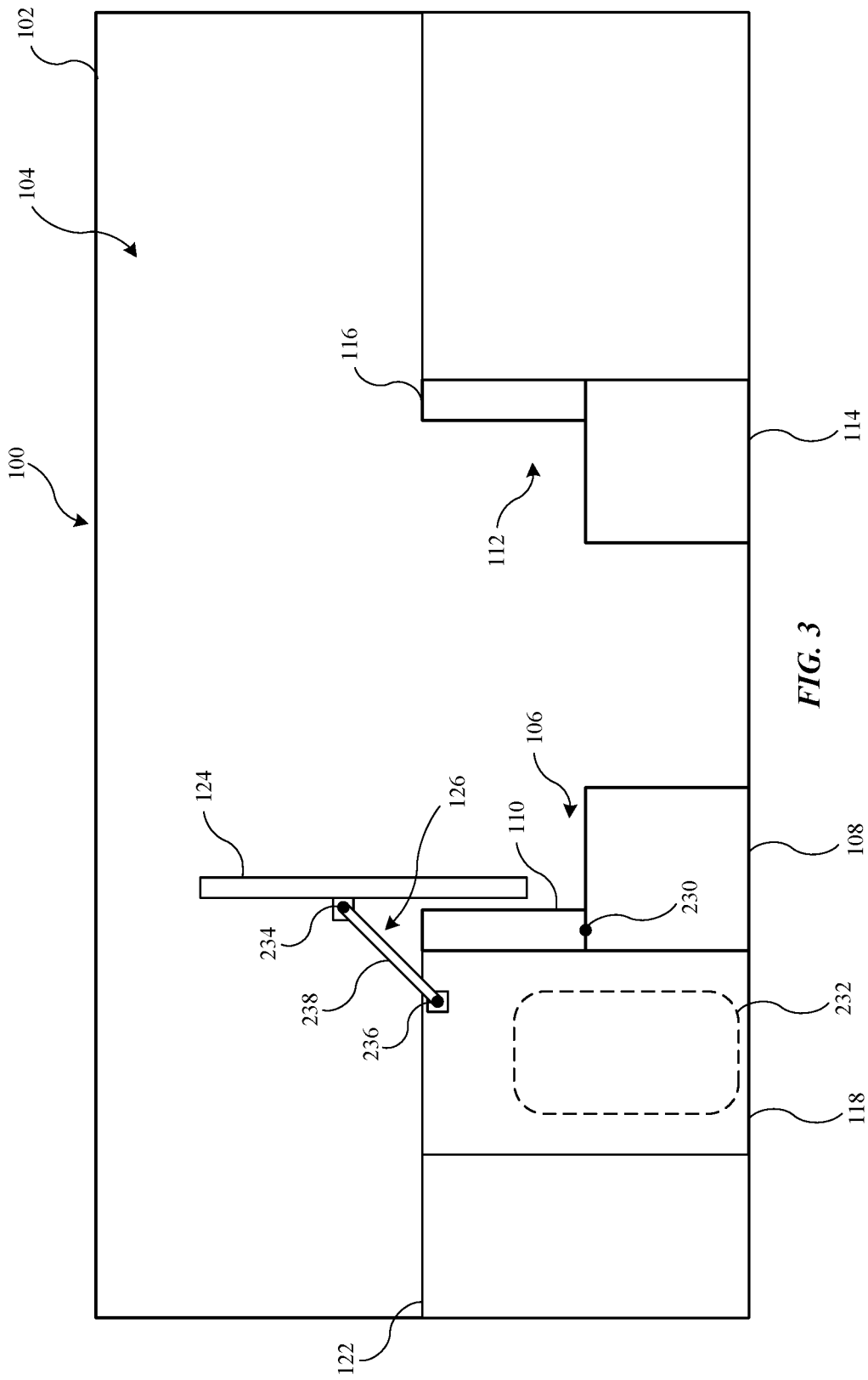
FIG. 3 is a side view of the passenger compartment of the vehicle with the display screen in a viewing position.

FIG. 3 is a side view of the passenger compartment 104 of the vehicle 100 with the display screen 124 in the viewing position. In the viewing position, the display screen 124 is oriented toward the second seat 112 so that the display screen 124 is viewable from the second seat 112. To move the display screen 124 from the storage position (as shown in FIGS. 1 and 2) to the viewing position, the arm 238 is rotated around the second pivot 236 and the display screen 124 is rotated around the first pivot 234. In an implementation, the display screen 124 is manually moved by a passenger from the storage position to the viewing position. In an implementation, the display screen 124 is automatically moved from the storage position to the viewing position when activated by a passenger. In this implementation, the first pivot 234 and the second pivot 236 include actuators, for example, a rotary electric motor.

Figure 4:
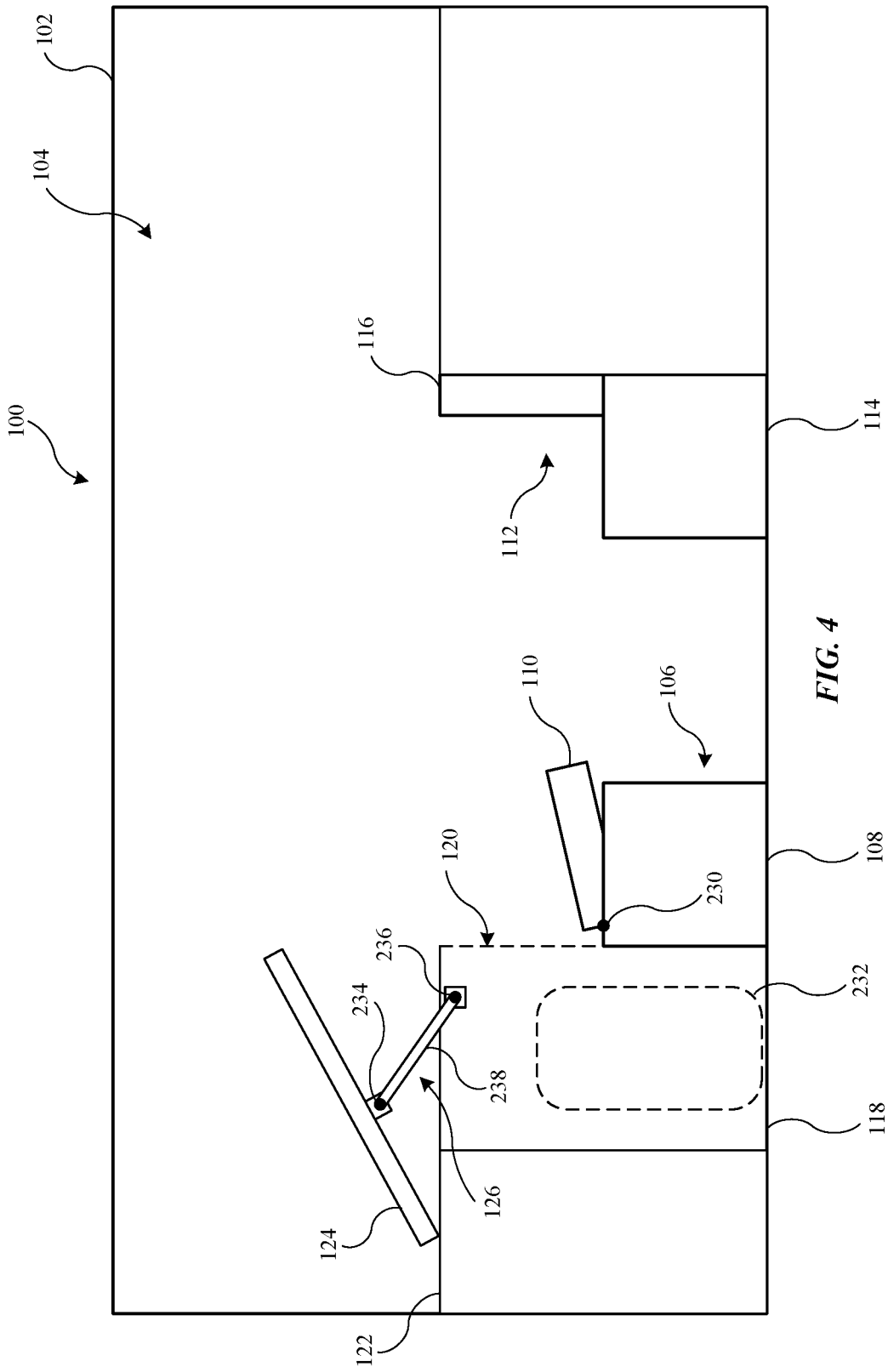
FIG. 4 is a side view of the passenger compartment of the vehicle with the display screen in a luggage access position.

FIG. 4 is a side view of the passenger compartment 104 of the vehicle 100 with the display screen 124 in the luggage access position. In an implementation, the display screen 124 may be moved to the luggage access position from the storage position. In an implementation, the display screen 124 may be moved to the luggage access position directly from the viewing position. In an implementation, the display screen 124 may be moved into the luggage access position from the viewing position after temporarily being in the storage position.

To move the display screen 124 to the luggage access position, the arm 238 is rotated around the second pivot 236 and the display screen 124 is rotated around the first pivot 234. In an implementation, the display screen 124 is manually moved by a passenger to the luggage access position. In an implementation, the display screen 124 is automatically moved to the luggage access position when activated by a passenger. In this implementation, the first pivot 234 and the second pivot 236 include actuators, for example, a rotary electric motor.

When the display screen 124 is in the luggage access position, the first seat back 110 may be rotated around the first seat pivot 230 (from a use position, as shown in FIGS. 2 and 3) toward the first seat bottom 108 (to a folded position, as shown in FIG. 4) to enlarge the unobstructed portion of the opening 120 such that a passenger can access the luggage compartment 118 via the vertical portion of the opening 120 (shown by a dashed line in FIG. 4). With the first seat 106 in the folded position, the opening 120 is larger to enable a passenger to stow and retrieve larger items, such as suitcases. If the first seat 106 is retained in the use position while the display screen 124 is in the luggage access position, a passenger may still access the portion of the opening 120 adjacent to the surface 122. In an implementation, the luggage compartment 118 may include a removable tray or insert that may be used to store small items. The removable tray or insert may be then removed from the luggage compartment 118 such that a passenger can access larger items in the luggage compartment 118.

Figure 5:
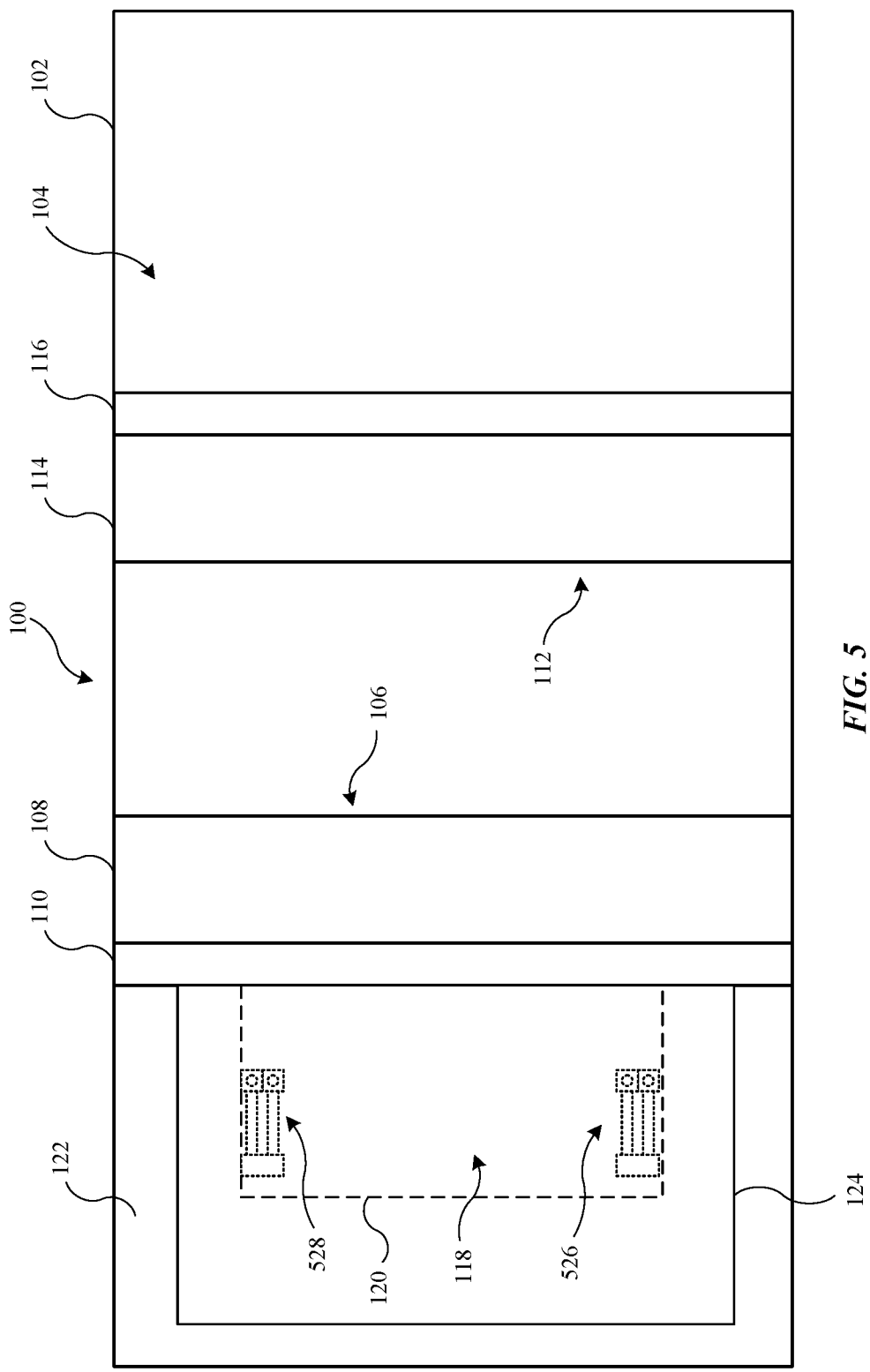
FIG. 5 is a top view of a second embodiment of the passenger compartment of the vehicle with the display screen in the storage position.

FIG. 5 is a top view of a second embodiment of the passenger compartment 104 of the vehicle 100 with the display screen 124 in the storage position. This embodiment is similar in certain respects to the embodiment shown in FIG. 1, and like reference numbers refer to the same elements.

A first support assembly 526 is positioned adjacent to the opening 120. A second support assembly 528 is positioned adjacent to the opening 120, at an opposite side of the opening 120 as the first support assembly 526. The first support assembly 526 and the second support assembly 528 are configured to support the display screen 124 and to move the display screen 124 between the storage position, the viewing position, and the luggage access position. It is noted that while the first support assembly 526 and the second support assembly 528 are shown in FIG. 5 as being positioned on an interior portion of the opening 120, the first support assembly 526 and the second support assembly 528 may be positioned on an exterior portion of the opening 120. In an implementation, the first support assembly 526 and the second support assembly 528 are positioned proximate to the opening 120 such that when the display screen 124 is in the storage position, the display screen 124 obstructs access to the opening 120 and that when the display screen 124 is in the luggage access position, the display screen 124 is spaced from the opening such that a passenger may access the luggage compartment 118.

While FIG. 5 shows both the first support assembly 526 and the second support assembly 528, in an implementation, only one support assembly may be used. In such an implementation, the support assembly is configured to support the display screen 124 such that the display screen 124 may be moved between the storage position, the viewing position, and the luggage access position.

Figure 6:
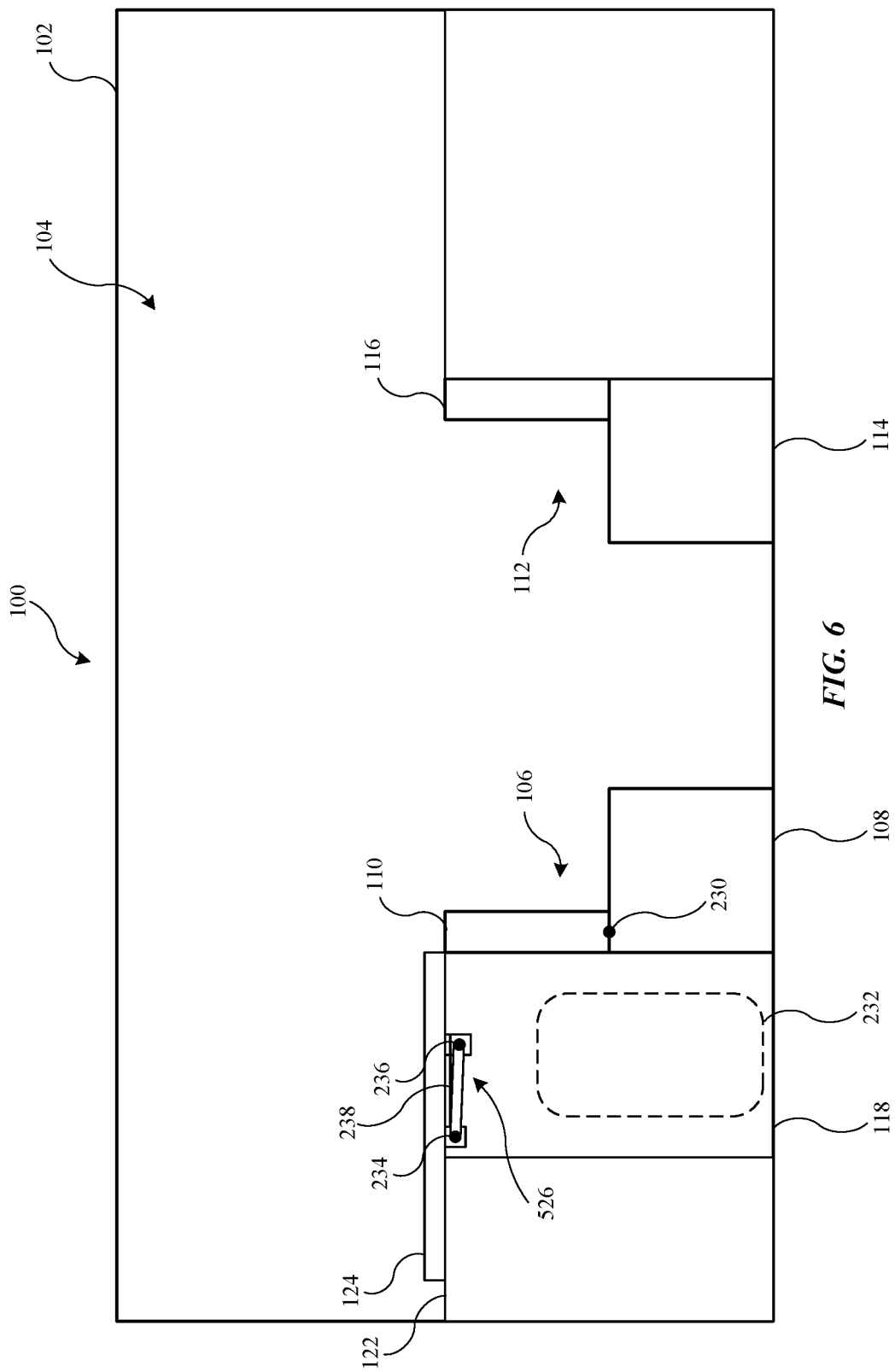
FIG. 6 is a side view of the second embodiment of the passenger compartment of the vehicle with the display screen in the storage position.

FIG. 6 is a side view of the second embodiment of the passenger compartment 104 of the vehicle 100 with the display screen 124 in the storage position. The first support assembly 526 includes a first pivot 234 connected to the display screen 124 and a second pivot 236 connected to the luggage compartment 118. In an implementation, the second pivot 236 may be connected to a different location of the body structure 102 proximate to the opening 120. The first pivot 234 and the second pivot 236 are support structures that include actuated or non-actuated pivot joints. The first pivot 234 and the second pivot 236 are connected to the display 124 and the luggage compartment 118, respectively, either directly or indirectly, such as by brackets, fasteners, frames, or other type of connector. The first pivot 234 is connected to the second pivot 236 by an arm 238. It is noted that while the second support assembly 528 is not shown in FIG. 6, the second support assembly 528 may be constructed in a similar manner as the first support assembly 526.

It is noted that the first support assembly 526 and the second support assembly 528 may take on different configurations, including other brackets, fasteners, frames, connectors, attachments, or mounting mechanisms such that the first support assembly 526 and the second support assembly 528 are connected to the display screen 124 and the luggage compartment 118, respectively, such that the display screen 124 can be moved between the storage position, the viewing position, and the luggage access position either manually by a passenger or automatically when initiated by a passenger.

Figure 7:
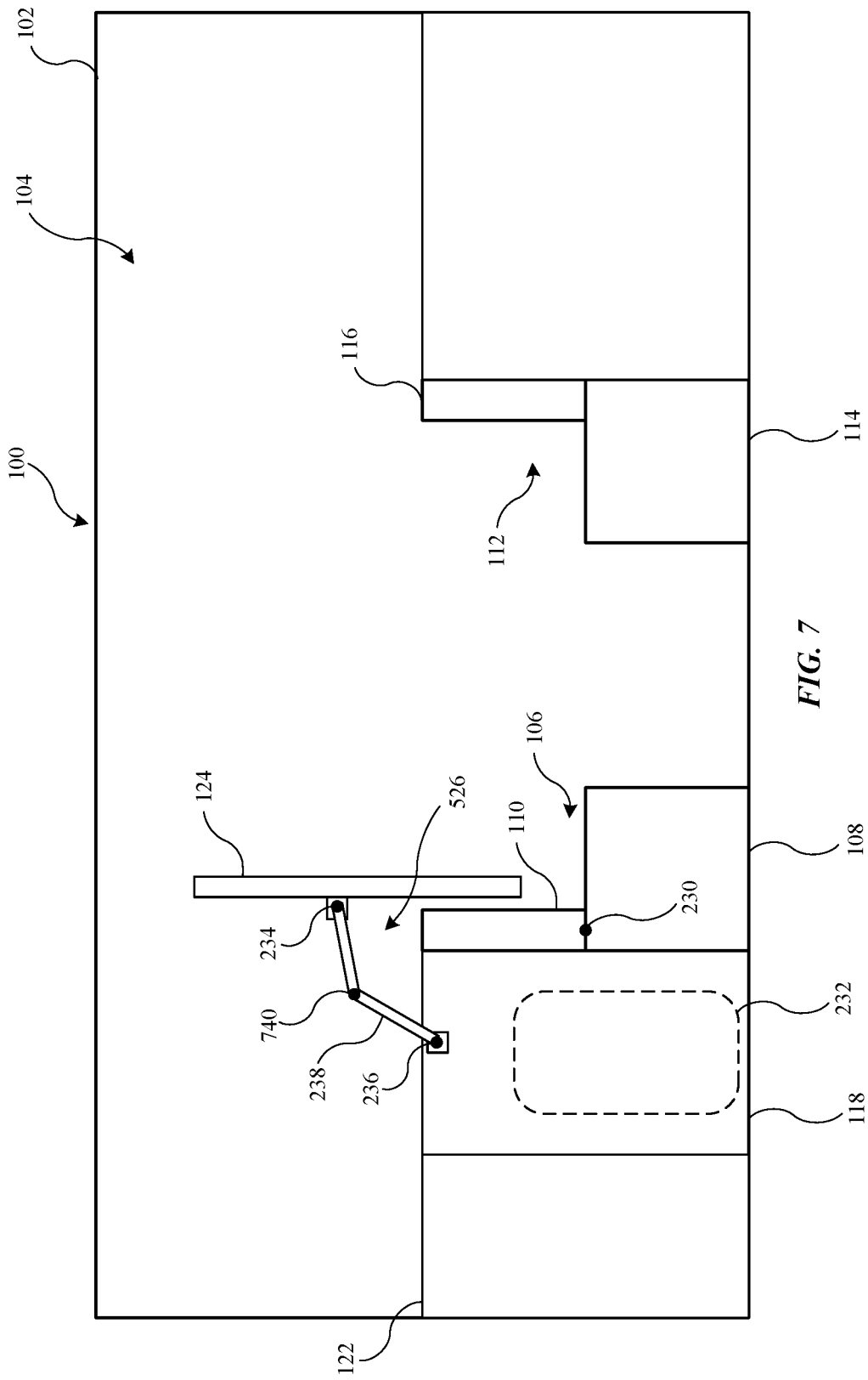
FIG. 7 is a side view of the second embodiment of the passenger compartment of the vehicle with the display screen in the viewing position.

FIG. 7 is a side view of the second embodiment of the passenger compartment 104 of the vehicle 100 with the display screen 124 in the viewing position. To move the display screen 124 from the storage position (as shown in FIGS. 5 and 6) to the viewing position, the arm 238 is rotated around the second pivot 236 and the display screen 124 is rotated around the first pivot 234. The arm 238 may be a segmented arm (e.g., including a first arm portion and a second arm portion) with the arm portions connected by a third pivot 740 such that the arm portions may rotate relative to each other. In an implementation, the display screen 124 is manually moved by a passenger from the storage position to the viewing position. In an implementation, the display screen 124 is automatically moved from the storage position to the viewing position when activated by a passenger. In this implementation, the first pivot 234 and the second pivot 236 include actuators, for example, a rotary electric motor.

Figure 8:
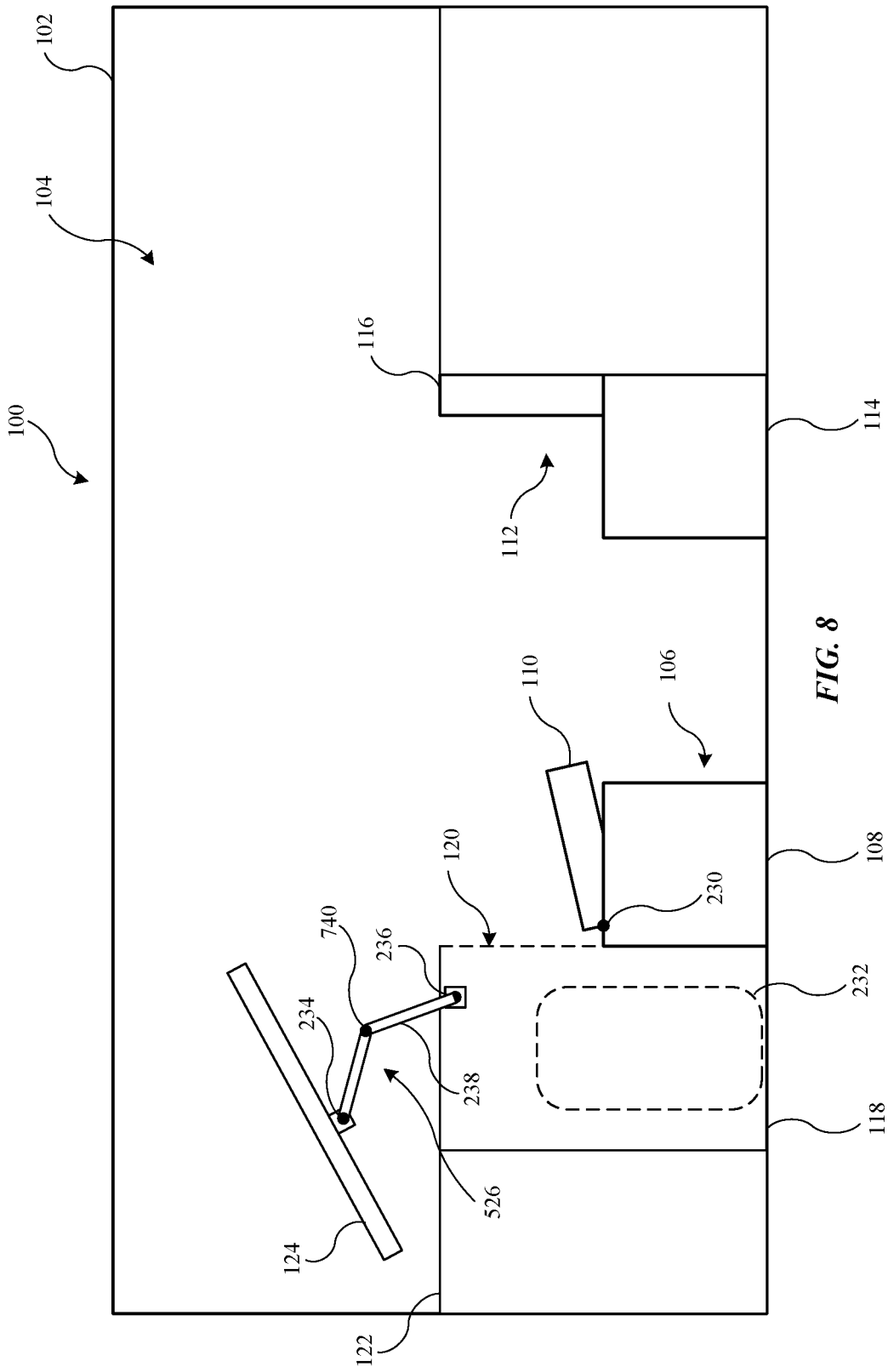
FIG. 8 is a side view of the second embodiment of the passenger compartment of the vehicle with the display screen in the luggage access position.

FIG. 8 is a side view of the second embodiment of the passenger compartment 104 of the vehicle 100 with the display screen 124 in the luggage access position. To move the display screen 124 to the luggage access position, the arm 238 is rotated around the second pivot 236 and the display screen 124 is rotated around the first pivot 234. The arm 238 may be a segmented arm (e.g., including a first arm portion and a second arm portion) with the arm portions connected by the third pivot 740 such that the arm portions may rotate relative to each other. In an implementation, the display screen 124 is manually moved by a passenger to the luggage access position. In an implementation, the display screen 124 is automatically moved to the luggage access position when activated by a passenger. In this implementation, the first pivot 234 and the second pivot 236 include actuators, for example, a rotary electric motor.

Figure 9:
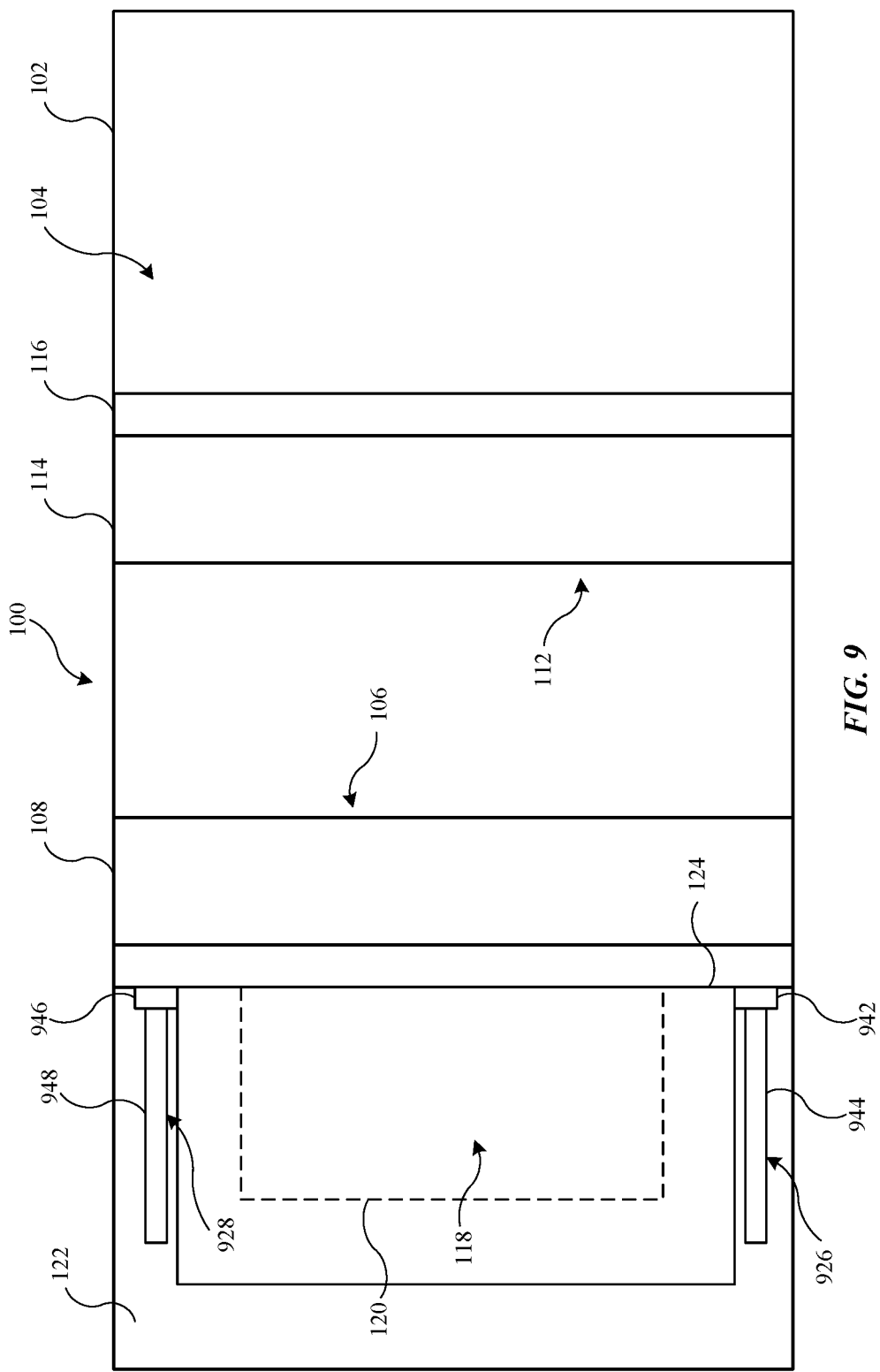
FIG. 9 is a top view of a third embodiment of the passenger compartment of the vehicle with the display screen in the storage position.

FIG. 9 is a top view of a third embodiment of the passenger compartment 104 of the vehicle 100 with the display screen 124 in the storage position. This embodiment is similar in certain respects to the embodiment shown in FIG. 1, and like reference numbers refer to the same elements.

A first support assembly 926 is positioned adjacent to the opening 120 and includes a first pivot 942 and a first track 944. The first pivot 942 is connected to the display screen 124 and moves along the first track 944. A second support assembly 928 is positioned adjacent to the opening 120, at an opposite side of the opening 120 as the first support assembly 926. The second support assembly 928 includes a second pivot 946 and a second track 948. The second pivot 946 is connected to the display screen 124 and moves along the second track 948.

The first support assembly 926 and the second support assembly 928 are configured to support the display screen 124 and to move the display screen 124 between the storage position, the viewing position, and the luggage access position. In an implementation, the first support assembly 926 and the second support assembly 928 are positioned proximate to the opening 120 such that when the display screen 124 is in the storage position, the display screen 124 obstructs access to the opening 120 and that when the display screen 124 is in the luggage access position, the display screen 124 is spaced from the opening such that a passenger may access the luggage compartment 118.

While FIG. 9 shows both the first support assembly 926 and the second support assembly 928, in an implementation, only one support assembly may be used. In such an implementation, the support assembly is configured to support the display screen 124 such that the display screen 124 may be moved between the storage position, the viewing position, and the luggage access position.

Figure 10:
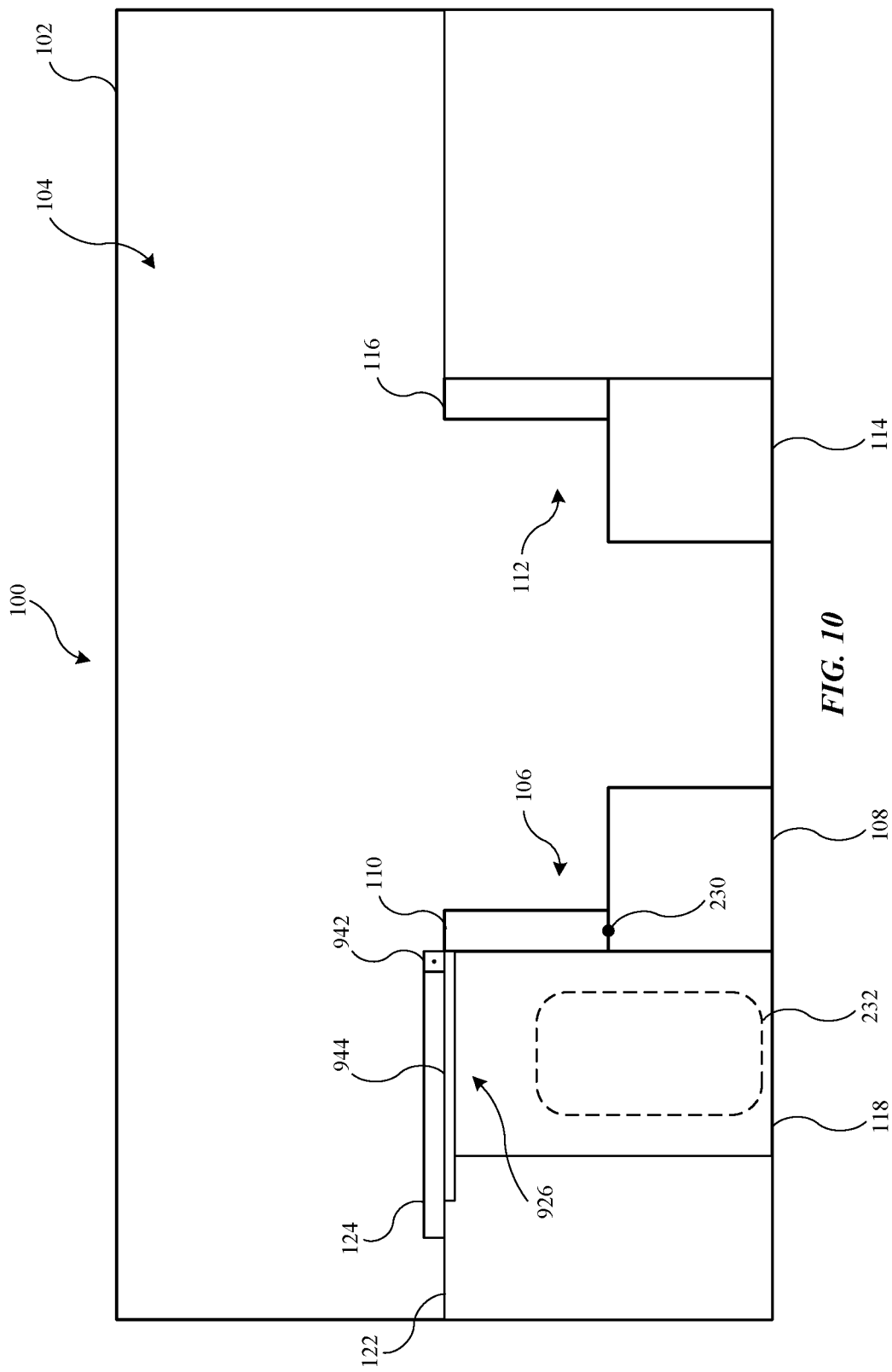
FIG. 10 is a side view of the third embodiment of the passenger compartment of the vehicle with the display screen in the storage position.

FIG. 10 is a side view of the third embodiment of the passenger compartment 104 of the vehicle 100 with the display screen 124 in the storage position. The first pivot 942 is a support structure that includes an actuated or a non-actuated pivot joint. The first pivot 942 is connected to the display 124 either directly or indirectly, such as by a bracket, a fastener, a frame, or other type of connector. The first pivot 942 is configured to move along the first track 944, for example, by a sliding motion. It is noted that while the second support assembly 928 is not shown in FIG. 10, the second support assembly 928 may be constructed in a similar manner as the first support assembly 926.

Figure 11:
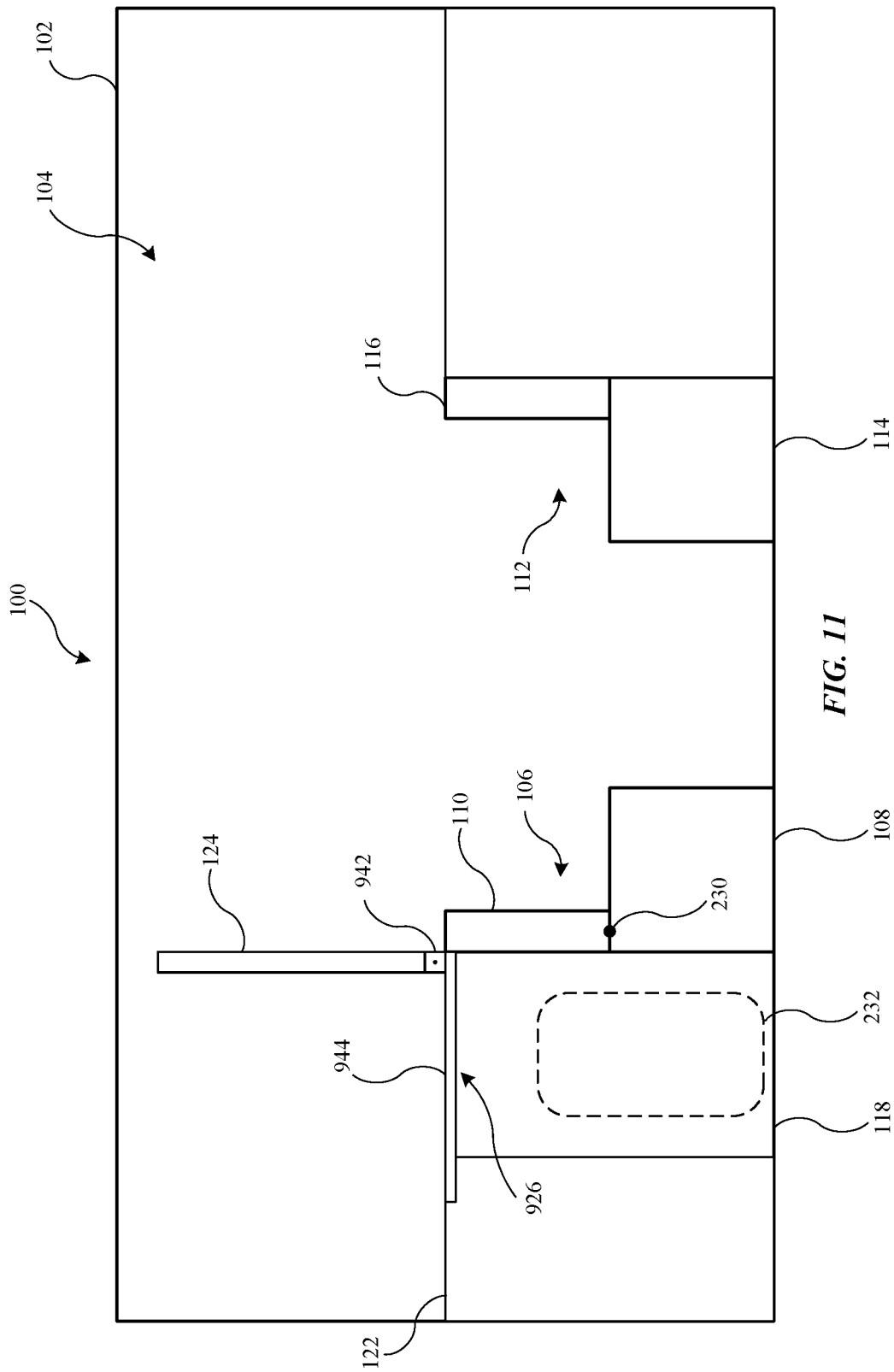
FIG. 11 is a side view of the third embodiment of the passenger compartment of the vehicle with the display screen in the viewing position.

FIG. 11 is a side view of the third embodiment of the passenger compartment 104 of the vehicle 100 with the display screen 124 in the viewing position. To move the display screen 124 from the storage position (as shown in FIGS. 9 and 10) to the viewing position, the display screen 124 is rotated around the first pivot 942 from a generally horizontal position (as shown in FIGS. 9 and 10) to a generally vertical position (as shown in FIG. 11). When the display screen 124 is in the viewing position, the first pivot 942 is located at a position on the first track 944 proximate to the first seat 106.

In an implementation, the display screen 124 is manually moved by a passenger from the storage position to the viewing position. In an implementation, the display screen 124 is automatically moved from the storage position to the viewing position when activated by a passenger. In this implementation, the first pivot 942 includes an actuator, for example, a rotary electric motor.

Figure 12:
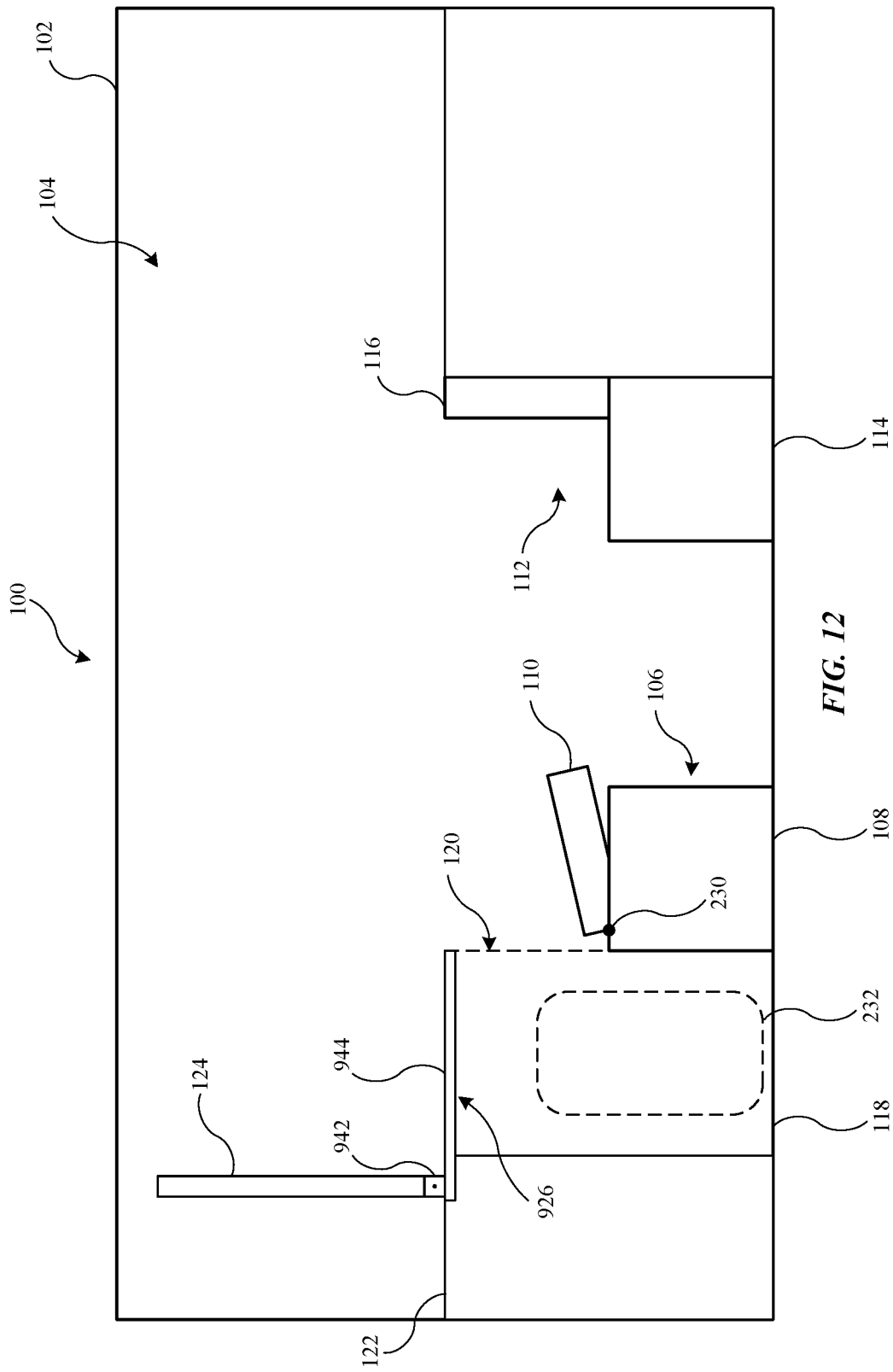
FIG. 12 is a side view of the third embodiment of the passenger compartment of the vehicle with the display screen in the luggage access position.

FIG. 12 is a side view of the third embodiment of the passenger compartment 104 of the vehicle 100 with the display screen 124 in the luggage access position. To move the display screen 124 to the luggage access position, the first pivot 942 is moved along the first track 944 away from the first seat 106 towards an outer perimeter of the passenger compartment 104. In an implementation, the display screen 124 is manually moved by a passenger to the luggage access position. In an implementation, the display screen 124 is automatically moved to the luggage access position when activated by a passenger. In this implementation, the first pivot 942 includes an actuator, for example, a rotary electric motor.

Figure 13:
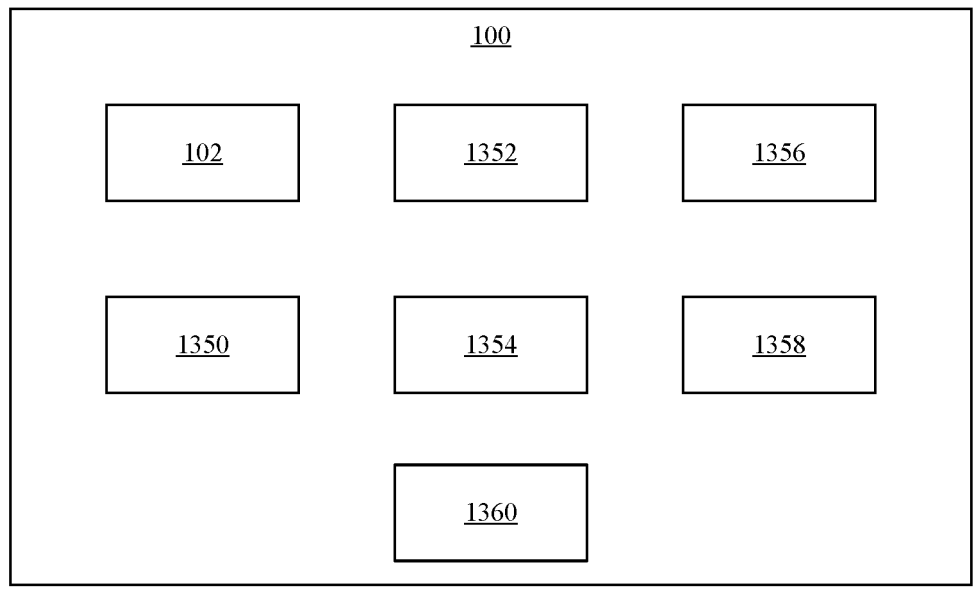
FIG. 13 is a block diagram that shows a vehicle.

FIG. 13 is a block diagram that shows the vehicle 100. As an example, the vehicle 100 may be a conventional road-going vehicle that is supported by wheels and tires (e.g., four wheels and tires). As an example, the vehicle 100 may be a passenger vehicle that includes a passenger compartment that is configured to carry one or more passengers. In an implementation, the vehicle 100 may be a non-road-going vehicle, including, but not limited to, a train, a boat, or an aircraft.

In the illustrated implementation, the vehicle 100 includes the body structure 102, a suspension system 1350, a propulsion system 1352, a braking system 1354, a steering system 1356, a sensing system 1358, and a control system 1360. These are examples of vehicle systems that are included in the vehicle 100. Other systems can be included in the vehicle 100.

The body structure 102 includes structural components of the vehicle 100 through which other components are interconnected and supported as well as aesthetic components of the vehicle 100. The body structure 102 may, for example, include or define the passenger compartment 104 for carrying passengers. The structural components of the body structure 102 may include, as examples, a frame, subframe, unibody, monocoque, etc. The aesthetic components of the body structure 102 may include exterior body panels, exterior trim panels, interior trim panels, fixtures, accessories, etc.

The suspension system 1350 controls vertical motion of the wheels of the vehicle 100 relative to the body structure 102, and may include passive suspension components and/or active suspension components. The propulsion system 1352 includes propulsion components that are configured to cause motion of the vehicle 100 (e.g., accelerating the vehicle 100), such as an internal combustion engine, one or more electric motors, a battery, an inverter, one or more gearboxes, etc. The braking system 1354 provides deceleration torque for decelerating the vehicle 100. The steering system 1356 is operable to cause the vehicle to turn by changing a steering angle of one or more wheels of the vehicle 100.

The sensing system 1358 includes sensors for observing external conditions of the environment around the vehicle 100 (e.g., location of the roadway and other objects) and conditions of the vehicle 100 (e.g., acceleration and conditions of the various systems and their components). The sensing system 1358 may include sensors of various types, including dedicated sensors and/or components of the various systems.

The control system 1360 includes communication components (i.e., for receiving sensor signals and sending control signals) and processing components (i.e., for processing the sensor signals and determining control operations), such as a controller. The control system 1360 may be a single system or multiple related systems. For example, the control system 1360 may be a distributed system including components that are included in other systems of the vehicle 100. The control system 1360 may be configured to control the automatic movement of the display screen 124 by sending commands or signals to motion control components such as electric motors. For example, the control system 1360 may be configured to send one or more commands in response to a user command received from a user interface device or in response to a condition such as arriving at a destination.

The control system 1360 may include autonomous driving functions that are configured to control operation of vehicle actuator systems of the vehicle 100 without manual control inputs. As an example, the control system 1360 may use inputs received from the sensing system 1358 to understand the environment around the vehicle and may determine commands that are sent to one or more vehicle actuator systems, such as the propulsion system 1352, the braking system 1354, and the steering system 1356, to cause the vehicle 100 to travel from a current location toward a destination location.

Figure 14:
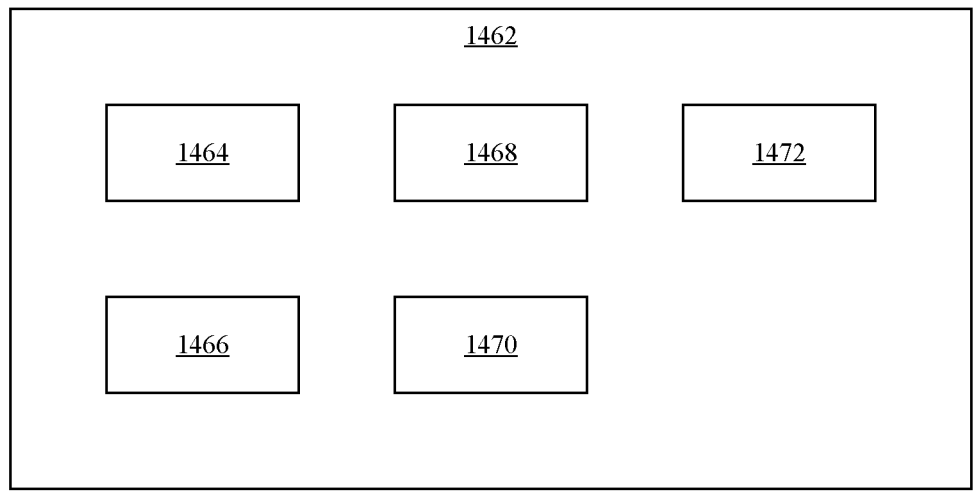
FIG. 14 is a block diagram that shows a controller.

FIG. 14 is a block diagram that shows a controller 1462 that may be used to implement the control system 1360 and/or other control systems of the vehicle 100. The controller 1462 may include a processor 1464, a memory 1466, a storage device 1468, one or more input devices 1470, and one or more output devices 1472. The controller 1462 may include a bus or a similar device to interconnect the components for communication. The processor 1464 is operable to execute computer program instructions and perform operations described by the computer program instructions. As an example, the processor 1464 may be a conventional device such as a central processing unit. The memory 1466 may be a volatile, high-speed, short-term information storage device such as a random-access memory module. The storage device 1468 may be a non-volatile information storage device such as a hard drive or a solid-state drive. The input devices 1470 may include any type of human-machine interface such as buttons, switches, a keyboard, a mouse, a touchscreen input device, a gestural input device, or an audio input device. The output devices 1472 may include any type of device operable to provide an indication to a user regarding an operating state, such as a display screen or an audio output, or any other functional output or control.

As described above, one aspect of the present technology is storage for a display screen, which may, in some implementations, include the gathering and use of data available from various sources to customize operation of the storage for the display screen based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in the support assembly for the display screen. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a customized storage for the display screen can be performed using non-personal information data or a bare minimum amount of personal information, other non-personal information available to the devices, or publicly available information.

What is claimed is:

1. A vehicle, comprising:
a first seat;
a surface located behind the first seat, wherein the surface defines an opening;
a display screen; and
a support assembly connected to the display screen,
wherein the support assembly is configured to move the display screen to:
a storage position, in which the display screen is positioned adjacent to the surface and obstructs the opening, and
an access position, in which the display screen is spaced from the surface and does not obstruct the opening; and
wherein the first seat includes a first seat back that is movable relative to a first seat bottom between a use position, in which access to the opening is obstructed by the first seat back, and a folded position, in which the first seat back permits access to the opening.

2. The vehicle of claim 1, further comprising:
a second seat, wherein the support assembly is further configured to move the display screen to a viewing position, in which the display screen is spaced from the surface and oriented toward the second seat so that the display screen is viewable from the second seat.

3. The vehicle of claim 2, wherein the second seat faces toward the first seat.

4. The vehicle of claim 2, wherein:
the display screen is located behind the first seat in the storage position; and
the display screen is located between the first seat and the second seat in the viewing position.

5. The vehicle of claim 1, wherein the support assembly includes an actuator configured to cause movement of the display screen.

6. The vehicle of claim 1, wherein the support assembly includes:
a first pivot connected to the display screen;
a second pivot connected to the surface located behind the first seat; and
an arm connected to the first pivot and the second pivot.

7. The vehicle of claim 6, wherein:
the arm is a segmented arm including a first arm portion and a second arm portion connected by a third pivot.

8. The vehicle of claim 1, wherein the support assembly includes:
a pivot connected to the display screen; and
a track configured to support the pivot,
wherein the pivot is configured to move along the track.

9. A vehicle, comprising:
a first seat;
a second seat;
a display screen; and
a support assembly that includes:
a first pivot connected to the display screen,
a second pivot connected to a surface, wherein the surface is located above a luggage compartment within the vehicle, the surface defines an opening that permits access to the luggage compartment, and the surface extends in a generally horizontal direction from a rear of the first seat, and
a segmented arm connected to the first pivot and the second pivot, wherein the segmented arm includes a first arm portion connected to a second arm portion by a third pivot,
wherein the support assembly is connected to the display screen, and wherein the support assembly is configured to move the display screen to:
a storage position, in which the display screen is not viewable from the second seat, and
a viewing position, in which the display screen is viewable from the second seat.

10. The vehicle of claim 9, wherein the display screen is located between the first seat and the second seat in the viewing position.

11. The vehicle of claim 9, wherein the support assembly includes an actuator configured to cause movement of the display screen.

12. The vehicle of claim 9, wherein:
the display screen is positioned adjacent to the surface and obstructs the opening in the storage position, and
the support assembly is further configured to move the display screen to a luggage access position, in which the display screen is spaced from the surface and permits access to the opening.

13. The vehicle of claim 12, wherein the first seat includes a first seat back that is movable relative to a first seat bottom between a use position, in which access to the opening is obstructed by the first seat back, and a folded position, in which the first seat back permits access to the opening.

14. The vehicle of claim 9, wherein the surface is located behind the first seat and the display screen is positioned adjacent to the surface in the storage position.

15. A vehicle, comprising:
a first seat;
a surface located forward of the first seat relative to a direction of travel of the vehicle, wherein the surface extends in a generally horizontal direction to a wall of a body of the vehicle;
a display screen; and
a support assembly that includes:
a pivot connected to the display screen, and
a track configured to support the pivot, wherein the pivot is configured to move along the track,
wherein the support assembly is configured to move the display screen to:
a storage position, in which the display screen is positioned adjacent to the surface, and
a viewing position, in which the display screen is spaced apart from the surface and located above the surface.

16. The vehicle of claim 15, further comprising:
a second seat,
wherein in the viewing position, the display screen is oriented toward the second seat so that the display screen is viewable from the second seat.

17. The vehicle of claim 16, wherein:
the second seat faces toward the first seat, and
the display screen is located between the first seat and the second seat in the viewing position.

18. The vehicle of claim 15, further comprising:
a luggage compartment located behind the first seat, wherein:
the surface is located above the luggage compartment and defines an opening that permits access to the luggage compartment,
the display screen is positioned adjacent to the surface and obstructs the opening in the storage position, and the support assembly is further configured to move the display screen to a luggage access position, in which the display screen is spaced from the surface and permits access to the opening.

19. The vehicle of claim 18, wherein the first seat includes a first seat back that is movable relative to a first seat bottom between a use position, in which access to the opening is obstructed by the first seat back, and a folded position, in which the first seat back permits access to the opening.

20. The vehicle of claim 1, further comprising:
a luggage compartment located behind the first seat, wherein the surface is located above the luggage compartment and the opening defined by the surface permits access to the luggage compartment.

21. The vehicle of claim 9, wherein the first pivot is connected to the display screen such that the display screen and the first pivot are located above the surface when the display screen is in the viewing position.

22. The vehicle of claim 15, wherein the first seat includes a first seat back movable with respect to a first seat bottom, and the surface is located below a top of the first seat back relative to an elevational direction of the body of the vehicle.

\* \* \* \* \*